F. W. FISHER AND J. C. OLSEN.
CORRUGATOR.
APPLICATION FILED MAR. 28, 1919.
1,314,315.
Patented Aug. 26, 1919.
2 SHEETS—SHEET 1.
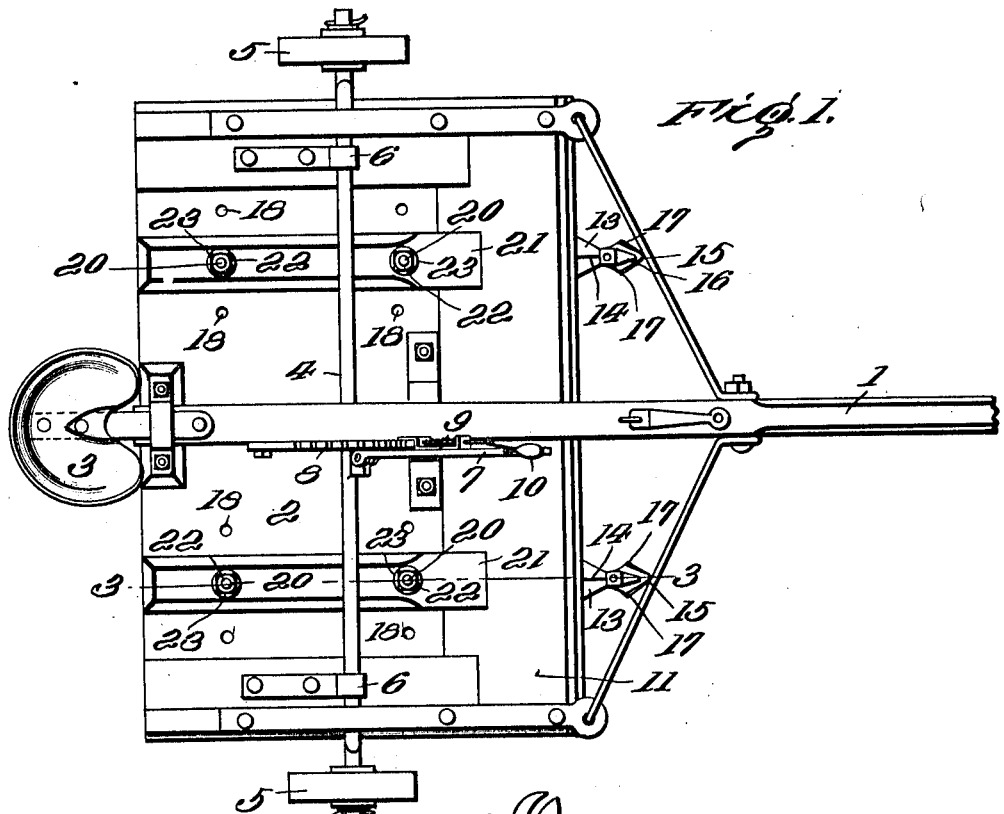
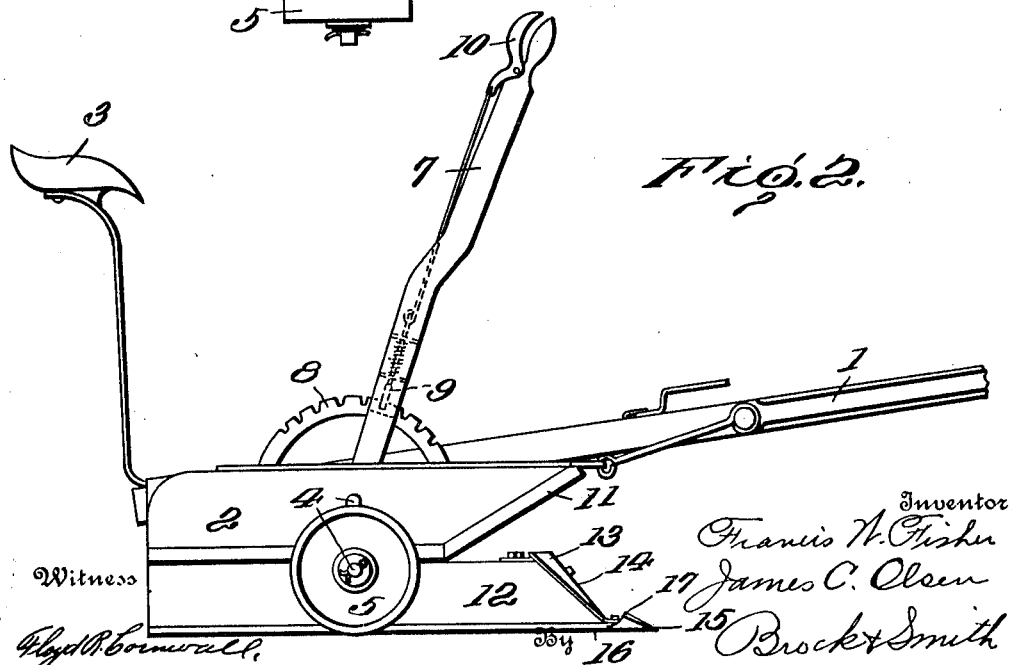

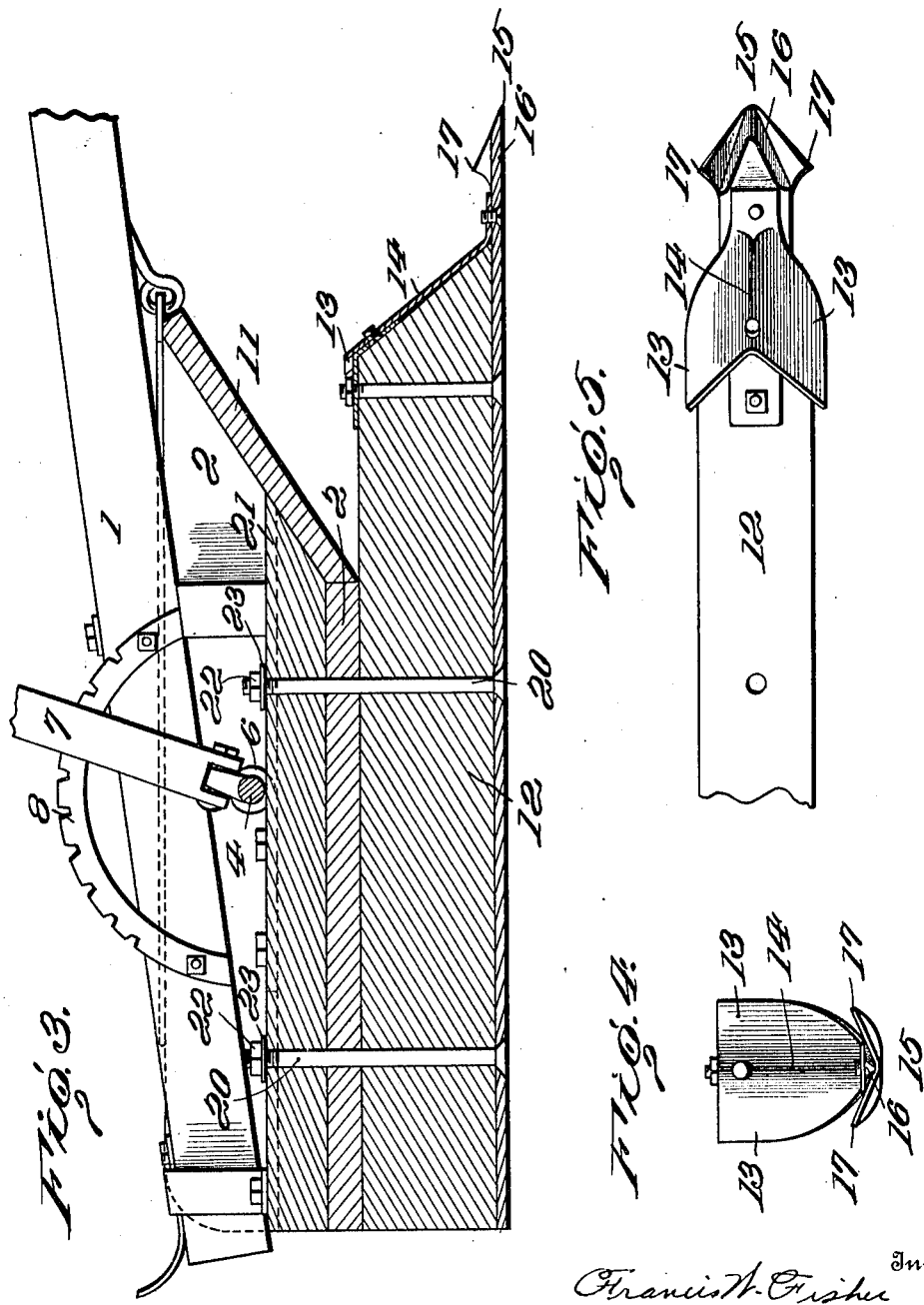

UNITED STATES PATENT OFFICE.

FRANCIS W. FISHER, OF BUHL, IDAHO, AND JAMES C. OLSEN, OF SALT LAKE CITY, UTAH.

CORRUGATOR.

1,314,315. Specification of Letters Patent. Patented Aug. 26, 1919.

Application filed March 28, 1919. Serial No. 285,844.

*To all whom it may concern:*

Be it known that we, F. W. FISHER and J. C. OLSEN, citizens of the United States, residing, respectively, at Buhl, in the county of Twin Falls and State of Idaho, and Salt Lake City, county of Salt Lake, and State of Utah, have invented certain new and useful Improvements in Corrugators, of which the following is a specification.

The subject matter of our invention is a corrugator or agricultural implement for furrowing or corrugating the surface of the ground under process of cultivation, to provide irrigation channels or small furrows, for equal distribution of the necessary water supply.

In the provision of such an implement for accomplishing this purpose, we utilize means whereby the implement may be adjusted at the desired depth for working either firm or softer ground, and these channels or furrows may be spaced apart at various intervals to suit different conditions, by adjustment of the furrow forming shovels and their runners on the implement. The invention also involves novel formations in the construction of the runners and their shovels as will be more particularly pointed out and claimed hereinafter.

In the accompanying drawings one complete example of the physical embodiment of the invention is illustrated, constructed and arranged according to the best mode we have so far devised for the practical application of the principles of the invention, and implements made as depicted in the drawing have proven highly satisfactory in service.

In the drawings—

Figure 1 is a plan view of the agricultural implement involving the present invention.

Fig. 2 is a side elevation of the implement.

Fig. 3 is an enlarged, longitudinal, vertical sectional view, showing specifically the shovel features of the invention.

Fig. 4 is a front view of one of the shovels.

Fig. 5 is a top plan view of one of the runners with its shovel in place.

The implement as constructed is designed to be pulled by horses, but of course other power may be applied if desired or required. When horsepower is utilized, the horses are hitched to the tongue 1 to which is firmly bolted the platform 2 supporting the usual driver's seat 3, and the platform is elevated from the ground by the crank axle 4 upon which the wheels 5, 5, are journaled.

The crank axle is journaled in bearings 6, 6, on the top of the platform, and the lever 7, located in convenient position for access by the driver, is fixed to the shaft so that movement of the lever is designed to swing the crank shaft in its wheel bearings, with the wheel journals as centers, in order to elevate or lower the platform in its relation to the surface of the ground. The usual rack segment 8, attached to the platform, is employed, and the spring pawl 9 and its thumb lever 10 are operatively connected with the lever 7.

At its front end, the platform is fashioned with an inclined board 11, rising from the under surface of the platform, and presenting an inclined surface to the soil or dirt that may be turned up too high, that will depress and smooth off the irregularities in the rows of said earth turned up by the implement, in order to preserve a uniform and even altitude for the hills or rows.

Below the platform are carried a series of runners upon which the shovels are secured, and as each runner and shovel are similar, the construction of one furrow opener will be sufficient for all.

Preferably the runners 12 are constructed of wood, the beam being of suitable length and transverse measurements, and its forward end is inclined backwardly, or cut on an oblique line to receive the face plate 13 of the shovel having an upwardly extending central ridge 14 from which the face plate is laterally inclined to the rear. This formation of the shovel, it will readily be apparent, is designed to pass the soil to either side of the runner as the implement progresses, and the furrow is formed by the point 15 of the shovel.

The point of the shovel is the forward end of a metallic shoe 16, which may or may not be integral with the shovel, and is securely fastened on the under surface of the runner, with its edges 17, 17, at the point slightly curled or turned up. Thus the runner has a metallic facing at its inclined front end and along its under surface, formed by the shovel and shoe, so that the runner itself is not subjected to wear, but is protected by the metallic facings secured thereon.

The number of shovels may be varied, according to the size of the platform, the number of furrows, and other conditions, and the runners may be spaced from each other in series with various intervals between them, by utilizing the transversely arranged sets of holes 18 in the platform.

Preferably the bolts 20 are passed upwardly from beneath the platform, being fixed in the runners, and extended through the openings in the platform, and in order to firmly and rigidly hold the runners clamped in position against the underside of the platform, a cleat 21 coinciding with the runner as to position, is located on the top of the platform. The bolts pass upwardly through the cleat and are fixed in rigid relationship by means of the nuts 22. If desirable, wear plates 23 of metal, may be used as face plates on the top surface of the platform to protect the holes.

The number of shovels employed on the implement may vary, and with this variation of the number of shovels, the width of the platform also varies, and the space or interval between the parallel shovels may also vary, usually from approximately twenty-six to thirty-six inches. In adjusting the shovels for various intervals between them the shovels and cleats are moved laterally and openings 18 are selected for the bolts 20, and the depth of the furrow cut in the surface of the ground is determined by the position of the shovel, the platform carrying the shovels being adjustable as to altitude or elevation by turning the lever of the crank axle.

Claim—

In an implement as described, the combination with the wheels, crank axle, and adjustable platform having a declining front board, of an adjustable furrow forming device carried by the platform comprising a runner having a wear shoe, a shovel and a shovel point, a fastening cleat on top of the platform, and bolts passed through the runner platform and cleat for securing the furrow forming device in position.

FRANCIS W. FISHER.
JAMES C. OLSEN.

Copies of this patent may be obtained for five cents each, by addressing the "Commissioner of Patents, Washington, D. C."